United States Patent [19]
Hughes

[11] Patent Number: 5,356,198
[45] Date of Patent: Oct. 18, 1994

[54] BICYCLE AND EXERCISER SEAT

[75] Inventor: Bradley E. Hughes, Agoura, Calif.

[73] Assignee: Western States Import Company, Inc., Camarillo, Calif.

[21] Appl. No.: 927,459

[22] Filed: Aug. 7, 1992

[51] Int. Cl.⁵ .............................. B60J 1/02; B60J 1/18
[52] U.S. Cl. ................................ 297/195.1; 297/214; 297/215.16
[58] Field of Search ............... 297/195.1, 209, 214, 297/208, 215.16; D6/354

[56] References Cited

U.S. PATENT DOCUMENTS

| | | | |
|---|---|---|---|
| 589,582 | 9/1897 | Shoe | 297/197 |
| 1,813,672 | 8/1929 | Mesinger | 297/208 |
| 1,936,403 | 11/1933 | Mesinger | 297/208 |
| 2,149,247 | 2/1939 | Mesinger | 297/197 |
| 2,318,246 | 5/1943 | Mesinger | 297/214 |
| 2,331,213 | 10/1943 | Mesinger | 297/214 |
| 3,077,363 | 2/1963 | Mesinger | 297/214 |
| 3,104,129 | 9/1963 | Mack | 297/215.16 |
| 3,856,348 | 12/1974 | Bird | 297/215.16 |
| 3,989,296 | 11/1976 | Naka | 297/209 |

FOREIGN PATENT DOCUMENTS

| | | | |
|---|---|---|---|
| 1527119 | 5/1968 | France | 297/195 |
| 1534658 | 8/1968 | France | 297/195 |
| 2589119 | 4/1987 | France | 297/215.16 |
| 14149 | of 1897 | United Kingdom | 297/195 |
| 540919 | 11/1941 | United Kingdom | 297/214 |
| 1163550 | 9/1969 | United Kingdom | 297/215.16 |

Primary Examiner—Alexander Grosz
Attorney, Agent, or Firm—Edward A. Sokolski

[57] ABSTRACT

A seat or saddle for use on a bicycle or bicycle type exerciser has a flexible plastic frame in the general shape and contour of the seat which has a large opening formed therein. Mounted in the opening and running between the forward and rear inner edges of the opening in a converging arrangement are a plurality of horizontal coil springs which are spaced from each other over the area of such opening. Attached to the frame and mounted over the springs is a foam rubber piece which is in the shape of the seat and which is thick enough to provide substantial cushioning. Mounted over the foam rubber piece and attached thereto and the bottom edge portion of the frame is a vinyl covering. A pair of large coil springs are vertically mounted normal to the horizontal springs on opposite sides of the bottom rear portion of the frame; these springs being supported on the bottom ends by support brackets which extend from the forward portion of the frame.

6 Claims, 3 Drawing Sheets

BICYCLE AND EXERCISER SEAT

BACKGROUND OF THE INVENTION

1. Field of the Invention

This invention relates to bicycle and exerciser seats or saddles and more particularly to such a seat having a frame with some degree of flexibility and both horizontal and vertical springs along with foam rubber padding to provide improved comfort.

2. Description of Related Art

Most bicycle and exercise seats or saddles of the prior art utilize large vertically mounted coil springs under the rear portion of the seat. This in conjunction with cushioning is generally all that is used to make the seat more comfortable to the rider. Some prior art seats have small mattress type springs mounted horizontally in the seat frame. Seats of this type are described in U.S. Pat. No. 589,581 issued Sep. 7, 1897 to W. W. Shoe; U.S. Pat. No. 1,813,672 issued Aug. 13, 1929 to F. Mesinger, U.S. Pat. No. 2,331,213 issued Oct. 5, 1943 to H. Mesinger; and U.S. Pat. No. 1,936,403 issued Nov. 21, 1933 to F. Mesinger. In Shoe, the springs are mounted in a diverging relationship in the rear portion of a metal frame. While the springs are mounted in a converging arrangement in the Mesinger '403 and '672 patents, they are not contained within an opening in the frame. Such prior art seats while providing adequate cushioning for more experienced younger riders generally do not satisfy the needs of the occasional rider and older or disabled riders who require greater seat comfort.

SUMMARY OF THE INVENTION

The device of the present invention is a seat or saddle for use on a bicycle or bicycle type exerciser which affords exceptional comfort to the rider. This is achieved by employing a frame for the seat preferably fabricated of a lightweight high strength plastic which forms the basic structure thereof and is contoured to establish the basic shape of the seat. The frame provides support with some degree of flexibility. This frame has a large opening in the central portion thereof, this opening following the general contours of the seat, being narrower at the forward end and widening towards the rear end. Strung between the inner forward and rear edges of the opening are a plurality of horizontal elongated coil springs, these springs being spaced over the entire area of the opening and converging towards the forward edge thereof. Such springs are relatively loosely mounted so that they readily give resiliently in directions normal to the longitudinal axis thereof.

Mounted over the springs to form the upper body of the seat is a relatively thick seat pad of resilient material such as foam rubber. A cover which may be of vinyl is stretched over the seat pad and attached to both the pad and the underside of the frame. A pair of large vertical springs are mounted on the opposite sides of the under rear portion of the frame, these springs being oriented substantially normally to the horizontal elongated springs. A bracket is attached to the lower end of each of the vertical springs, such brackets being attached at the opposite ends to the forward end of the seat frame. The seat thus has three fold cushioning which is provided by the horizontal springs, the resilient pad, and the vertical springs. Further, the seat frame provides support for the rider with a degree of flexibility not afforded in prior art seats employing frames made of steel and other such hard material.

It is therefore an object of this invention to provide a seat for a bicycle or bicycle type exerciser which provides exceptional comfort to the user.

It is a further object of this invention to provide a bicycle or exerciser seat which combines the resilient action of horizontally oriented springs, a seat pad, a frame and vertical springs to afford cushioning.

DETAILED DESCRIPTION OF THE INVENTION

Figure 1:
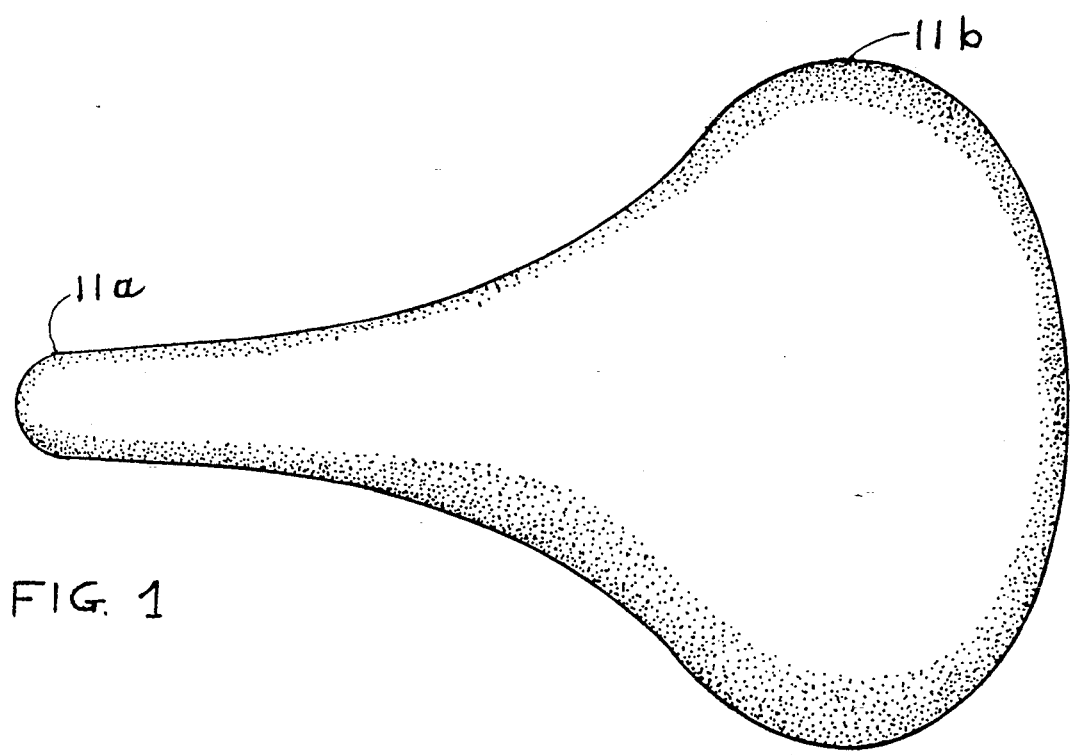
FIG. 1 a top plan view of a preferred embodiment of the invention.
Figure 2:
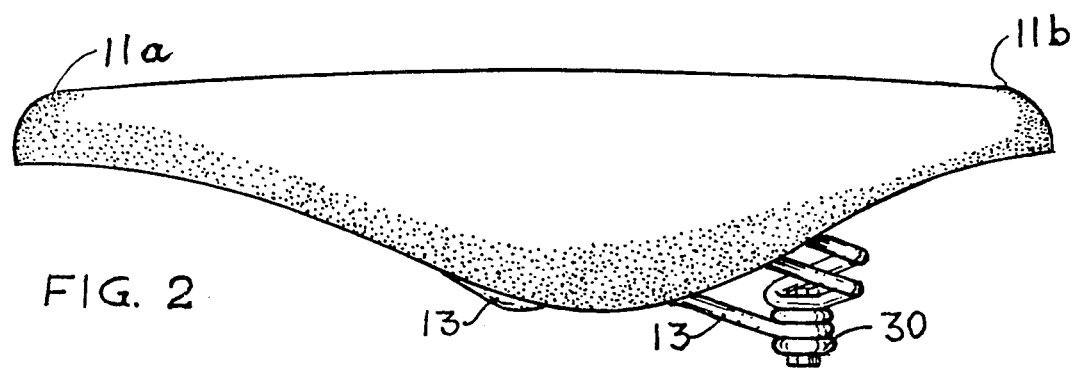
FIG. 2 is a side elevational view of the preferred embodiments.
Figure 3:
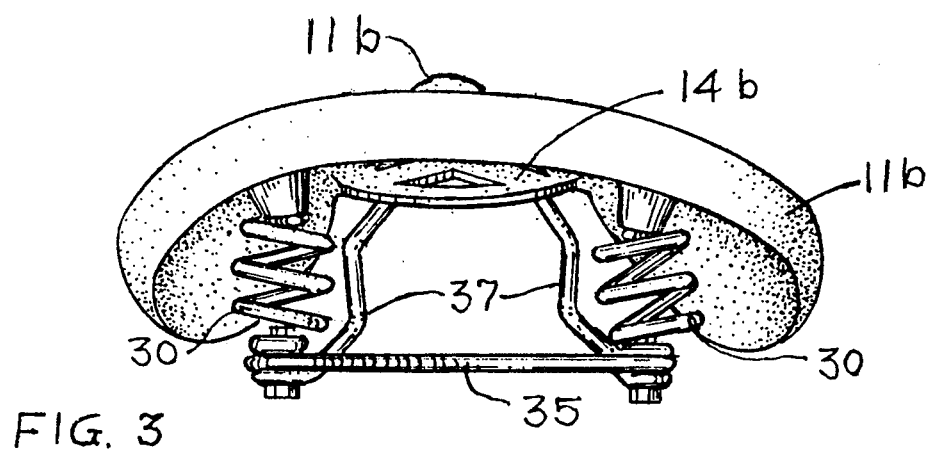
FIG. 3 is a rear elevational view of the preferred embodiment.
Figure 4:
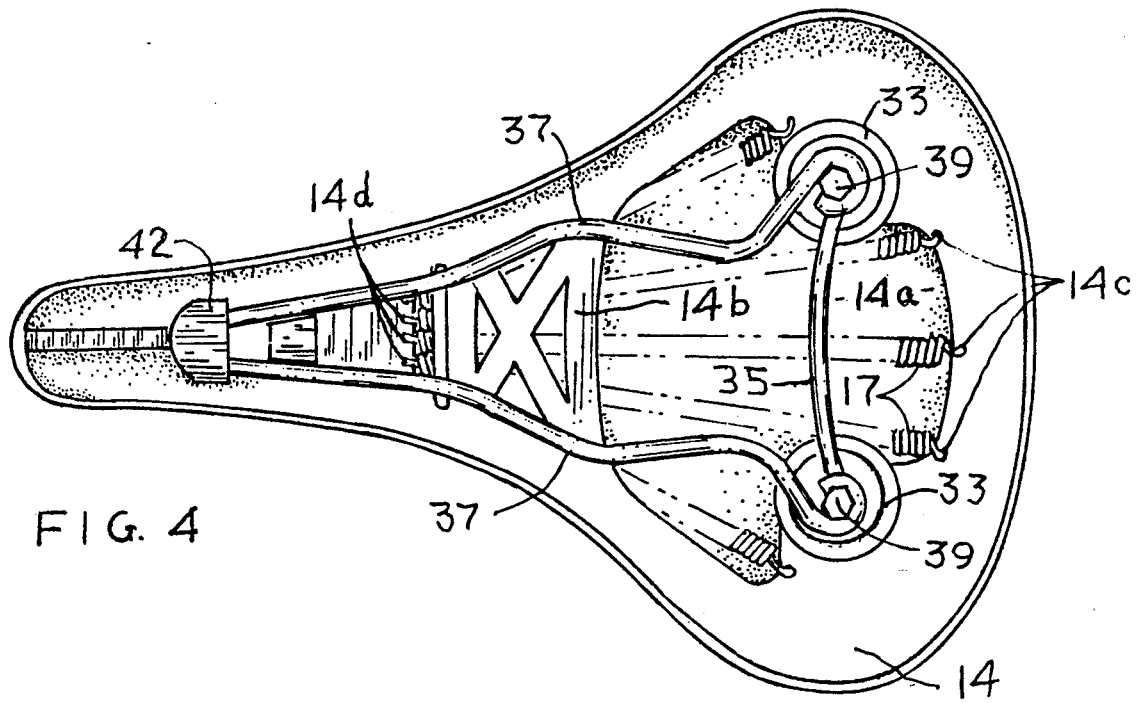
FIG. 4 is a bottom plan view of the preferred embodiment.

Referring now to the Figures, a preferred embodiment of the invention is illustrated.

The seat has a conventional shape with a narrow forward portion 11a which flanges outwardly to a rear widened portion 11b. The main body of the seat is formed by a frame 14 fabricated of a durable light weight material having some degree of flexibility which may be an engineering plastic compound such as polypropylene. Frame 14 is contoured to form the basic shape of the seat and has a large opening 14a in the central portion thereof and a downwardly bowed bridge portion 14b which reinforces the frame structure.

A plurality of elongated coil springs are strung across opening 14a. These springs are spaced from each other in a converging arrangement to evenly cover the opening and are hooked at their opposite ends in holes 14c formed along the rear edge of the opening and holes 14d formed along the forward edge of such opening. The springs are fairly loosely strung so as to readily respond resiliently to forces normal to the longitudinal axis thereof.

Figure 6:
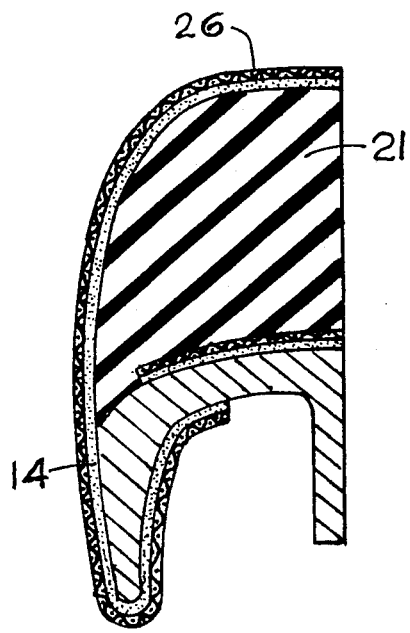
FIG. 6 is a cross sectional view taken along the plane indicated by 6—6 in FIG. 5.
Figure 5:
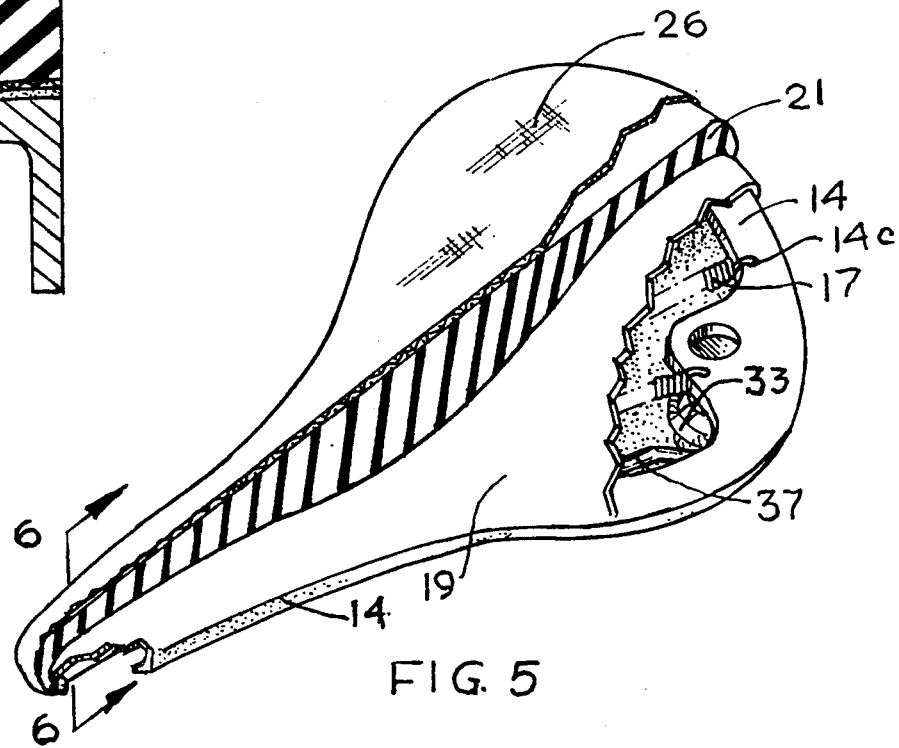
FIG. 5 is a top front perspective of the preferred embodiment with sections cut away for ease of illustration.
Figure 7:
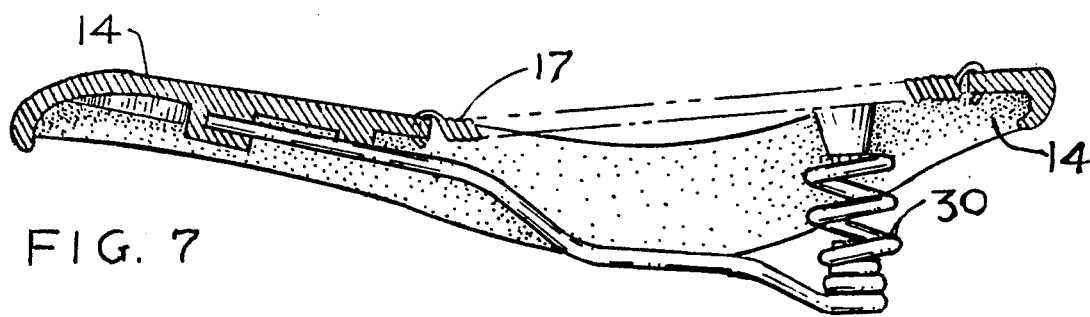
FIG. 7 is a cross sectional view taken along the plane indicated by 7—7 in FIG. 8.
Figure 8:
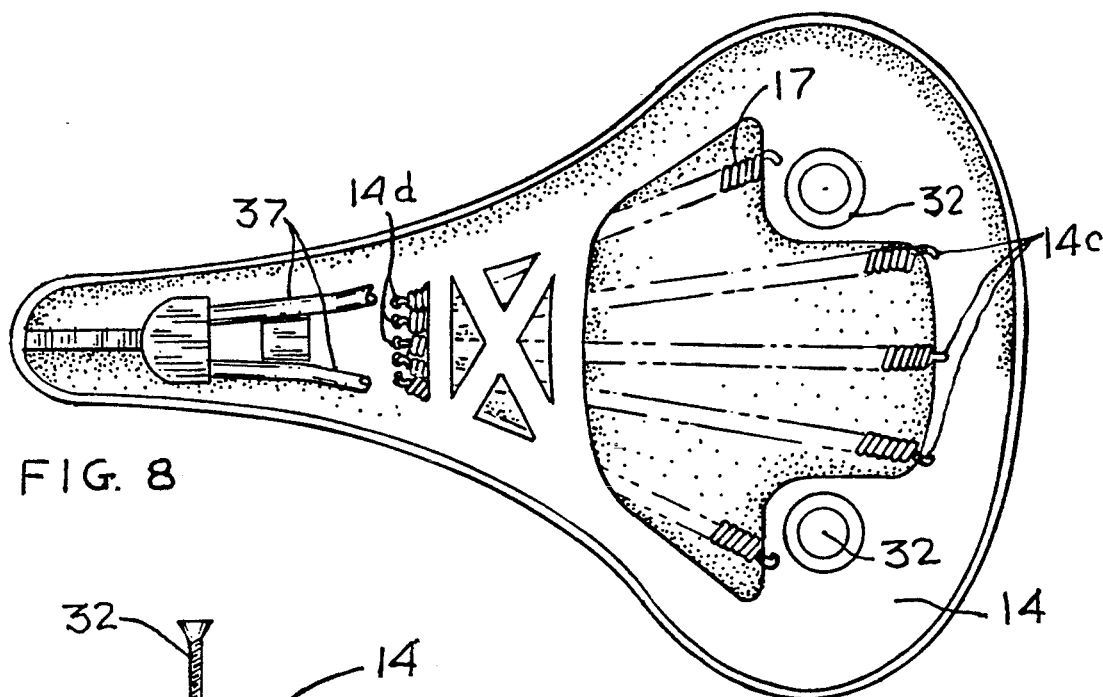
FIG. 8 is a bottom plan view of the preferred embodiment with portions cut away to facilitate illustration.
Figure 10:
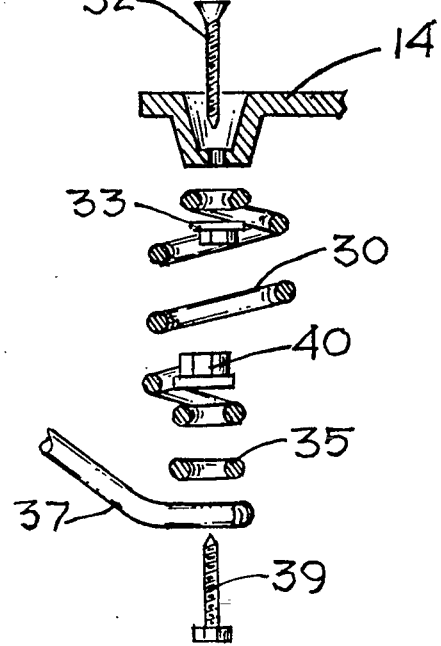
FIG. 10 is a schematic view illustrating the attachment of the rear vertical springs.

As can best be seen in FIGS. 5 and 6, cloth covering 19 is fixedly attached to the top surface of frame 14 and overlies the frame and springs 17. Pad 21 is contoured to form the top portion of the seat and is fixedly attached to cloth covering 19 and the side portions of frame 14. Pad 21 is relatively thick at its center (about 1" in the preferred embodiment) and is made of a resilient material such as polyurethane foam rubber.

The top surface of the seat is covered with cover 26 which is tightly drawn over pad 21 and attached both to the lower edges of pad 21 and frame member 14 by means of adhesive. Cover 26 may be of a flexible and durable vinyl material.

Figure 9:
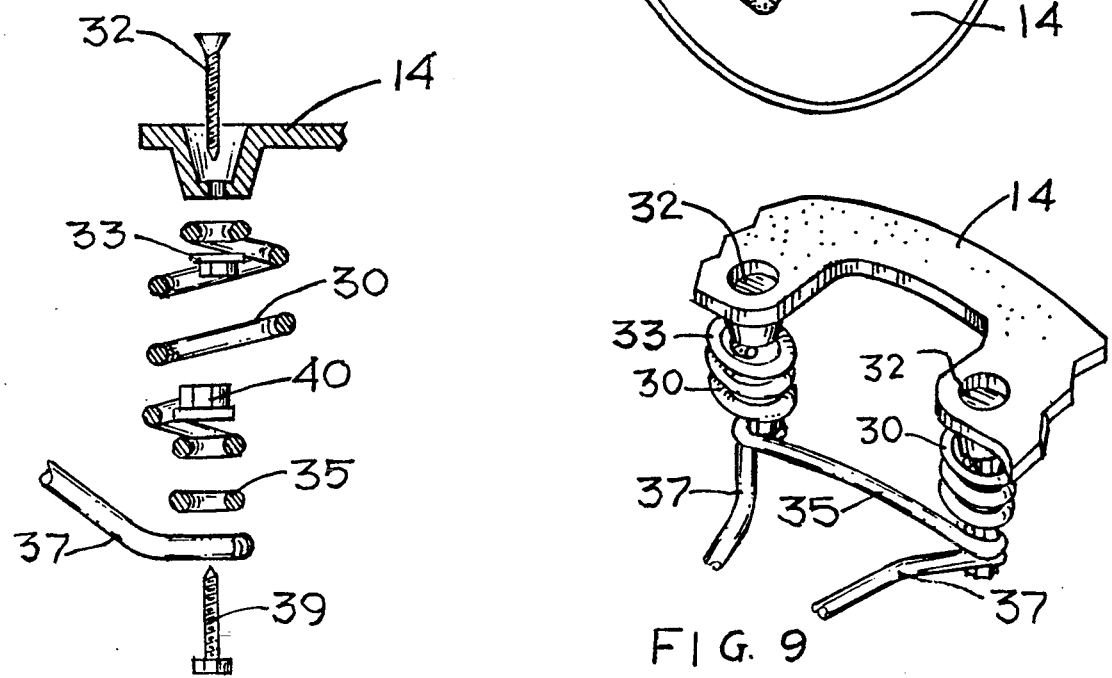
FIG. 9 is a perspective view illustrating the rear vertical springs of the preferred embodiment.

As best can be seen in FIG. 9, a pair of large vertical springs 30 are attached to opposite portions of the rear of frame 14 by means of bolts 32 and nuts 33. The opposite ends of the springs are braced by means of interconnecting bar 35 and bracing bars 37 which are attached to the bottom ends of the springs by means of bolts 39 and nuts 40. Bracing bars 37 are retained in holder member 42 formed integrally with the forward bottom portion of frame 14.

The seat of the invention thus provides extensive cushioning for the rider or user of the exerciser by virtue of the combined cushioning effect of the horizontal springs 17, the frame 14, the pad 21 and the vertical springs 30.

While the invention has been described and illustrated in detail, it is to be clearly understood that this is intended by way of illustration and example only and not by way of limitation, the scope of the invention being limited only by the terms of the following claims.

I claim:

1. A seat for use in a bicycle or exerciser comprising:
   a frame fabricated of a flexible plastic material contoured to form the basic shape of the seat, said frame having an opening in the central portion thereof, said opening having a rear edge and a forward edge which is substantially narrower thin said rear edge,
   means for providing a resilient support strung between the rear and forward edges of said opening, said resilient support means evenly covering said opening and converging towards said forward edge, and
   a seat pad of resilient material mounted over said resilient support means and attached to said frame said seat pad being contoured to form the shape of the top of the seat said seat further including a cover for the top of said seat, stretched over said seat pad, and attached to said frame and said seat pad.

2. The seat of claim 1 wherein said resilient support means are elongated coil springs.

3. The seat of claim 1 wherein said seat pad is contoured to form the shape of the top of said seat.

4. The seat of claim 1 wherein said frame is fabricated of polypropylene.

5. A seat for use in a bicycle or exerciser comprising:
   a frame fabricated of a flexible plastic material contoured to form the basic shape of the seat, said frame having an opening in the central portion thereof, said opening having a rear edge and a forward edge which is substantially narrower than said rear edge, said frame further having a downwardly bowed bridge portion extending across said opening near the forward edge thereof and holder means formed in the forward portion thereof,
   means for providing a resilient support strung between the rear and forward edges of said opening in an arrangement which converges towards said forward edge, said resilient support means evenly covering said opening,
   a seat pad of resilient material mounted over said resilient support means and attached to said frame, said seat pad being contoured to form the shape of the top of said seat,
   a cover for the top of said seat stretched over said seat pad and attached to said frame,
   a pair of coil springs mounted on opposite sides of said frame in the vicinity of the rear edge of the opening therein, said pair of coil springs being oriented substantially normally to said resilient support means,
   bracing bars connected between the lower ends of each of said coil springs and the holder means of said frame, and
   an interconnecting bar connected between the lower ends of said coil springs.

6. The seat of claim 5 and further including a cloth covering located between said paid and said elongated springs, said cloth covering being attached to said pad and said frame.

* * * * *

REEXAMINATION CERTIFICATE (2897th)

United States Patent [19]

Hughes

[11] B1 5,356,198

[45] Certificate Issued May 28, 1996

[54] BICYCLE AND EXERCISER SEAT

[75] Inventor: Bradley E. Hughes, Agoura, Calif.

[73] Assignee: Western States Import Company, Inc., Camarillo, Calif.

Reexamination Request:
No. 90/003,666, Dec. 19, 1994

Reexamination Certificate for:
Patent No.: 5,356,198
Issued: Oct. 18, 1994
Appl. No.: 927,459
Filed: Aug. 7, 1992

[51] Int. Cl.[6] .................................. B62J 1/02; B62J 1/18
[52] U.S. Cl. .................. 297/195.1; 297/214; 297/215.16
[58] Field of Search .......................... 297/195.1, 215.16, 297/209, 208, 214; D6/354

[56] References Cited

U.S. PATENT DOCUMENTS

| | | | |
|---|---|---|---|
| 3,856,348 | 12/1974 | Bird | 297/195 |
| 4,898,422 | 2/1990 | West, III | 297/202 |
| 5,165,752 | 11/1992 | Terry | 297/214 |

FOREIGN PATENT DOCUMENTS

| | | | |
|---|---|---|---|
| 58577 | 3/1941 | Denmark. | |
| 1047299 | 12/1953 | France. | |
| 2589119 | 10/1985 | France | 297/215.16 |
| 2057488 | 2/1990 | Japan. | |
| 217599 | 12/1993 | Taiwan. | |
| 24561 | of 1899 | United Kingdom. | |
| 696897 | 9/1953 | United Kingdom. | |
| 1163550 | 9/1969 | United Kingdom | 297/215.16 |

OTHER PUBLICATIONS

Bicycle Dealer, Mar. 1992, p. 195 Terry Precision Bicycles for Women; advertisement.
Bicycling, Apr. 1992, p. 104.
Weaver, A Woman's Guide to Cycling 1991, p. 132.

*Primary Examiner*—Alex Grosz

[57] ABSTRACT

A seat or saddle for use on a bicycle or bicycle type exerciser has a flexible plastic frame in the general shape and contour of the seat which has a large opening formed therein. Mounted in the opening and running between the forward and rear inner edges of the opening in a converging arrangement are a plurality of horizontal coil springs which are spaced from each other over the area of such opening. Attached to the frame and mounted over the springs is a foam rubber piece which is in the shape of the seat and which is thick enough to provide substantial cushioning. Mounted over the foam rubber piece and attached thereto and the bottom edge portion of the frame is a vinyl covering. A pair of large coil springs are vertically mounted normal to the horizontal springs on opposite sides of the bottom rear portion of the frame; these springs being supported on the bottom ends by support brackets which extend from the forward portion of the frame.

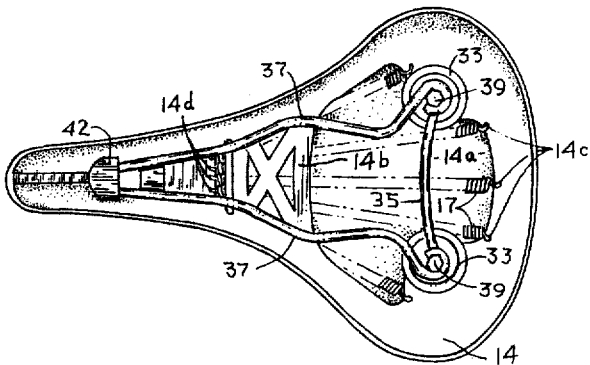

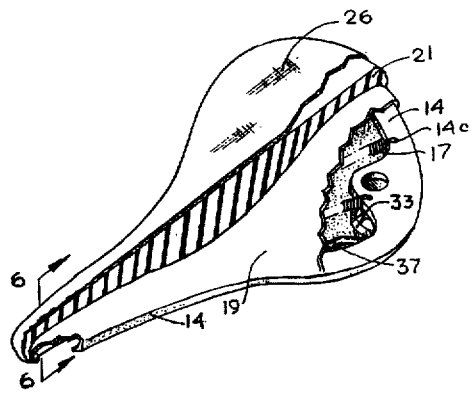

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 5 is confirmed.

Claims 1–4 are cancelled.

Claim 6, dependent on an amended claim, is determined to be patentable.

New claim 7 is added and determined to be patentable.

6. The seat of claim 5 and further including a cloth covering located between said [paid] *pad* and said [elongated springs] *means for providing a resilient support*, said cloth covering being attached to said pad and said frame.

*7. A seat for use in a bicycle or exerciser comprising:*

*a frame fabricated of a flexible plastic material contoured to form the basic shape of the seat, said frame having an opening in the central portion thereof, said opening having a rear edge and a forward edge which is substantially narrower than said rear edge,*

*elongated coil springs strung between the rear and forward edges of said opening, said elongated coil springs evenly covering said opening and converging towards said forward edge, and*

*a seat pad of resilient material mounted over said elongated coil springs and attached to said frame said seat pad being contoured to form the shape of the top of the seat said seat further including a cover for the top of said seat, stretched over said seat pad, and attached to said frame and said seat pad.*

* * * * *